United States Patent [19]

Tso

[11] Patent Number: 4,769,078

[45] Date of Patent: Sep. 6, 1988

[54] ORGANOPHILIC CLAY MODIFIED WITH BETAINE TYPE COMPOUNDS

[75] Inventor: Su C. Tso, Louisville, Ky.

[73] Assignee: United Catalysts, Inc., Louisville, Ky.

[21] Appl. No.: 164,795

[22] Filed: Mar. 7, 1988

[51] Int. Cl.$^4$ .......................... C09K 3/00; C04B 14/00
[52] U.S. Cl. ................................ 106/287.25; 106/504; 106/468; 106/481; 106/490; 501/148
[58] Field of Search .......... 106/308 N, 308 F, 287.25; 501/148

[56] References Cited

U.S. PATENT DOCUMENTS 4,510,081  4/1985  Bronner et al. .................. 106/15.05
4,631,091  12/1986  Goodman ............................ 501/149

Primary Examiner—Theodore Morris
Attorney, Agent, or Firm—Herbert P. Price

[57] ABSTRACT

Organophilic clays, having enhanced dispersibility in organic systems are made by reacting a smectite type clay with a quaternary ammonium compound and a betaine type compound. These organophilic clays are useful for alteriing the rheological properties of organic systems.

7 Claims, No Drawings

ORGANOPHILIC CLAY MODIFIED WITH BETAINE TYPE COMPOUNDS

BACKGROUND OF THE INVENTION

The field of art to which this invention pertains is organophilic modified clays.

Organophilic clays which are compatible with organic liquids have been know for some time. Their preparation and various uses have been described in, for example, U.S. Pat. Nos. 2,531,427 and 2,966,506. As taught by these references, naturally occurring water dispersible clays, such as montmorillonite, are reacted with "onium" compounds to produce organic clay complexes which are compatible with organic liquids.

In order to obtain maximum dispersibility and maximum thickening or gelling efficiency using organophilic clays, it has been necessary to add a low molecular weight polar organic compound to the composition. Such polar organic compounds have been called polar activators. Methanol is an example of a useful polar compound.

Organophilic clays which are said to have enhanced dispersibility in organic systems without using a polar activator are described in U.S. Pat. No. 4,105,578. Such organophilic clays are made from the reaction of smectite-type clays with a methyl benzyl dialkyl ammonium compound wherein the alkyl groups contain at least 16 carbon atoms.

Other organophilic clays having enhanced dispersibility in organic systems are described in U.S. Pat. Nos. 4,412,018, 4,434,075, and 4,434,076. These compositions are made by reacting a smectite-type clay with an organic cation, such as a quaternary ammonium compound and an organic anion, such as an organic acid.

Additional organophilic clays with enhanced dispersibility are described in U.S. Pat. No. 4,450,095.

SUMMARY OF THE INVENTION

This invention is directed to easily dispersible organophilic clays made by modifying a smectite-type clay with a quaternary ammonium compound and a betaine type compound.

The compositions of this invention are the reaction products of a smectite type clay having a cation exchange capacity of at least about 75 milliequivalents per 100 grams of clay and (A) a quaternary ammonium compound having the structure:

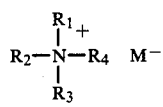
(A)

wherein $R_1$ is an alkyl group having about 12 to about 22 carbon atoms, wherein $R_2$, $R_3$ and $R_4$ are alkyl groups containing 1 to about 22 carbon atoms, aryl groups and aralkyl groups containing 7 to about 22 carbon atoms and wherein M is chloride, bromide, iodide, nitrite, hydroxide, nitrate, sulfate, or acetate, further modified with (B) a betaine type compound having the structure:

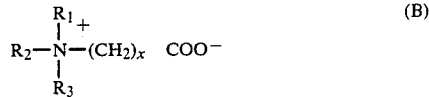

wherein $R_1$, $R_2$ and $R_3$ are as defined hereinabove and wherein x is an integer from 1 to 4. The compositions of this invention contain about 50 to about 200 milliequivalents (meq.) of the quaternary ammonium compound (A) and about 1 to about 100 meq. of the betaine type compound (B), said meqs being biased on 100 grams (active basis) of clay.

DESCRIPTION OF THE INVENTION

The clays used to prepare the compositions of this invention are smectite-type clays which have a cation exchange capacity of at least 75 milliequivalents per 100 grams of clay. Particularly desirable types of clays are the naturally occurring Wyoming varieties of swelling bentonites and like clays, and hectorite, a swelling magnesium-lithium silicate clay.

The clays, especially the bentonite type clays, are preferably converted to the sodium form if they are not already in this form. This can be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, followed by shearing the mixture with a pug mill or extruder.

The quaternary ammonium compounds used in this invention contain at least one alkyl substituent on the nitrogen atom having at least 12 carbon atoms up to about 22 carbon atoms. The other nitrogen substituents are (a) linear or branched alkyl groups having 1 to about 22 carbon atoms, (b) aralkyl groups, such as benzyl and substituted benzyl and (c) aryl groups, such as phenyl and substituted phenyl. The quaternary ammonium compounds can be represented by the structural formula:

(A)

wherein M is an anion, such as chloride, bromide, iodide, nitrite, acetate, hydroxide, nitrate, sulfate and the like and wherein $R_1$ is an alkyl group having about 12 to about 22 carbon atoms, and $R_2$, $R_3$ and $R_4$ are alkyl groups containing 1 to about 22 carbon atoms, aralkyl groups containing 7 to 22 carbon atoms, aryl groups containing 6 to 22 carbon atoms and mixtures thereof. Preferred quaternary ammonium compounds are those wherein $R_1$ and $R_2$ are alkyl groups having about 12 to about 22 carbon atoms and $R_3$ and $R_4$ are methyl.

The long chain alkyl groups can be derived from naturally occurring vegetable oils, animal oils and fats or petrochemicals. Examples include corn oil, cotton seed oil, coconut oil, soybean oil, castor oil, tallow oil and alpha olefins. A particularly useful long chain alkyl group is derived from hydrogenated tallow.

Other alkyl groups which can be present in the quaternary ammonium compound are such groups as methyl, ethyl, propyl, butyl, hexyl, 2-ethylhexyl, decyl, dodecyl, lauryl, stearyl and the like.

Aryl groups include phenyl and substituted phenyl. Araalkyl groups include benzyl and substituted benzyl groups.

Example of useful quaternary ammonium compounds are dimethyl di(hydrogenated tallow) ammonium chloride, methyl tri(hydrogenated tallow) ammonium chloride, dimethyl benzyl hydrogenated tallow ammonium chloride, methyl benzyl di(hydrogenated tallow) ammonium chloride and the like. A preferred quaternary ammonium compound is dimethyl di(hydrogenated tallow) ammonium chloride.

The betaine type compound useful in this invention has the structure:

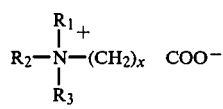  (B)

wherein $R_1$, $R_2$ and $R_3$ are the same as defined hereinabove and wherein x is an integer having a value of 1 to 4. These compounds do not fall within the strict definition of betaines. However, by virtue of the fact that they contain a quaternary ammonium nitrogen atom which is substituted with a carboxyl containing radical and that they form an inner salt, these compounds are being referred to as betaine type compounds. These compounds, being inner salts of quaternary ammonium compounds, react with smectite type clays in the same manner as the quaternary ammonium compounds (A).

The betaine type compounds are made by reacting a tertiary amine with an alpha-halo-acid salt as described in U.S. Pat. No. 2,958,682 or by reacting a tertiary amine with acrylic or methacrylic acid by the procedure described in U.S. Pat. No. 4,012,437.

Preferred betaine type compounds are those wherein $R_1$ and $R_2$ are alkyl groups containing 12 to 22 carbon atoms, $R_3$ is methyl and x is one. The most preferred betaine type compound is the one wherein $R_1$ and $R_2$ are derived from hydrogenated tallow, $R_3$ is methyl and x is one.

The compositions of this invention contain about 50 to about 200 meqs of the quaternary ammonium compound (A), preferably about 100 to about 140 meqs, and about 1 to about 100 meqs of the betaine type compound (B), preferably about 20 to about 50 meqs, wherein the meqs are based on 100 grams of clay on a 100 percent active basis.

In preparing the organophilic clays of this invention, the smectite type clays are slurried in water at a concentration of about 1 to about 10 weight percent. The clay slurry is then filtered and/or centrifuged to remove impurities, such as sand particles. The cleaned slurry is again slurried in water at a concentration of about 1.5 to about 5 weight percent and is heated to about 40° to about 95° C., preferably about 60° to about 75° C. The quaternary ammonium compound and the betaine type compound, preferably as an emulsion in water or alcohol, are added. Agitation and heating are continued for about 15 minutes to about 2 hours to complete the reaction of the compounds with the clay. When the reaction is completed, the excess water is removed and the organophilic clay is dried.

The compositions of this invention can be used as rheological additive in a wide variety of non-aqueous liquid systems. These organophilic clays are useful in paints, varnishes, enamels, waxes, adhesives, inks, laminating resins, gel coats and the like. These organophilic clays are easily dispersible and can be incorporated into the non-aqueous liquids at any stage without the addition of a polar activator.

The organophilic clays are used in amounts sufficient to obtain the desired rheological properties, such as high viscosity at low shear rates, control of sagging in paint applications and the prevention of settling and hard packing of pigments present in paints. The amount of organophilic clay employed in these non-aqueous fluid compositions will be between about 0.1 and about 10 percent by weight based on the total weight of the compositions and, preferably, between about 0.3 and 3 weight percent.

The following examples describe the invention in more detail. Parts and percentages unless otherwise designated are parts and percentages by weight.

EXAMPLE 1

To a suitable reactor were added two thousand parts of an aqueous slurry of Wyoming bentonite at 1.8 percent solids which had previously been centrifuged to remove non-clay impurities. Agitation was begun and heat was applied raising the temperature to 75° C. To the slurry were added 264.8 parts of an aqueous emulsion of dimethyl di(hydrogenated tallow) ammonium chloride at 7.79 percent concentration. After mixing for 15 minutes, a premix of 79.4 parts of the aqueous emulsion of dimethyl di(hydrogenated tallow) ammonium chloride (7.79 percent concentration) and 10.1 parts of N,N'-di(hydrogenated tallow) N-methyl betaine (68.9 percent concentration) was added. Mixing and heating at 75°–80° C. was continued for 30 minutes. The solid organophilic clay product was then isolated and dried.

EXAMPLE 2

To a suitable reactor were added two thousand parts of the aqueous Wyoming bentonite described in Example 1. Agitation was begun and the slurry was heated to 75° C. To the clay slurry were added 344.2 parts of an aqueous emulsion of dimethyl di(hydrogenated tallow) ammonium chloride at 7.79 percent concentration and 10.1 parts of N,N'-di(hydrogenated tallow) N-methyl betaine at 68.9 concentration and heating was continued for 30 minutes. The resulting organophilic clay product was isolated and dried.

EXAMPLE 3, 4 AND 5

Organophilic clays were prepared using the same procedure, reactants and amounts of reactants as described in Example 1.

EXAMPLE 6

The organophilic clays of Examples 1 and 2 were evaluated for dispersibility and viscosity efficiency using the following procedure:

A resin solution, 190 grams, was added to a Tri-pour beaker along with 2 grams of a stock solution of zirconium, calcium and cobalt driers. The beaker was placed on a Dispermat mixer at 500 rpm. The organophilic clay, 10 grams, was added. Mixing at 500 rpm was continued for 20 minutes with the grind checked every 5 minutes. The mixing was increased to 1750 rpm for two minutes and the final grind check was made. After one hour, the viscosity of the mixture was checked with a Brookfield model RVT viscometer.

One of the resin solutions used in these evaluations was a long oil soya alkyd at 50 percent solids in mineral spirits. The other resin solution was a fast drying chain stopped alkyd at 50 percent solids in xylene.

The fineness of dispersion, referred to as grind, was measured according to ASTM D1210-78. This measurement was made using a Hegman fineness of grind gauge rated in a scale range of 0 to 8 where 0 is equal to a film thickness of 4 mils and 8 is equal to a film thickness of zero mils. The grind gauge is a stainless steel block in which a channel of continually varying depth has been cut out. The solution to be tested is placed in the channel at the deepest end and cast down the full length of the channel. The fineness of grind of the system is determined at the point along the channel depth at which the pigment particles are first visible above the surface of the solution film.

The evaluation results are listed in Table I.

TABLE I

| | Soya Alkyd | | Chain Stopped Alkyd | |
|---|---|---|---|---|
| | Ex. 1 | Ex. 2 | Ex. 1 | Ex. 2 |
| Hegman Grind | | | | |
| 5 minutes | 5 | 6 | 5 | 4 |
| 10 minutes | 6 | 6 | 5 | 5 |
| 15 minutes | 6 | 6 | 5 | 5 |
| 20 minutes | 6 | 6 | 5 | 5 |
| Final | 6 | 6 | 6 | 5 |
| Brookfield Visc. cps, 1 Hr. | | | | |
| 0.5 rpm | — | 18,480 | 24,200 | 24,800 |
| 100 rpm | — | 293 | 423 | 399 |

EXAMPLE 7

The organophilic clays of Examples 3, 4 and 5 were evaluated in the soya alkyd resin solution using the procedure described in Example 6. The results of the evaluations are listed in Table II.

TABLE II

| | Soya Alkyd | | |
|---|---|---|---|
| | Ex. 3 | Ex. 4 | Ex. 5 |
| Hegman Grind | | | |
| 5 minutes | 4 | 4 | 4 |
| 10 minutes | 5 | 7 | 4 |
| 15 minutes | 5 | 7 | 4 |
| 20 minutes | 5 | 7 | 5 |
| 25 minutes | 6 | 7 | 5 |
| 30 minutes | 6 | 7 | 5 |
| Final | 7 | 7 | 5 |
| Brookfield cps, 1 Hr. | | | |
| 0.5 rpm | 10,300 | 12,480 | 10,220 |
| 100 rpm | 260 | 212 | 242 |

EXAMPLE 8

Dispersibility and viscosity efficiency of the organophilic clays of Example 3, 4 and 5 were also determined in a semi-gloss enamel formulation using the following procedure:

300 grams of paint were added to a 400 ml polypropylene beaker. Mixing was applied using a laboratory mixer with a propeller stirrer set one third of an inch above the bottom of the beaker. Mixing speed was held at 500 rpm. The organoclay, 1.34 grams, was added within 10 seconds. As soon as the addition was completed, timing was begun. Samples were taken at 5 minutes intervals to determine the grind. Viscosity was determined as described in Example 6.

The results of the evaluation are listed in table III.

TABLE III

| | Semi-Gloss Enamel | | |
|---|---|---|---|
| | Ex. 3 | Ex. 4 | Ex. 5 |
| Hegman Grind | | | |
| 5 minutes | 5 | 4 | 4 |
| 10 minutes | 5 | 5 | 4 |
| 15 minutes | 6 | 6 | 5 |
| 20 minutes | 6 | 7 | 5 |
| 25 minutes | 6 | 7 | 5 |
| 30 minutes | 7 | 7 | 5 |
| Final | 7 | 7 | 7 |
| Brookfield cps, 1 Hr. | | | |
| 0.5 rpm | 5,680 | 6,980 | 6,680 |
| 100 rpm | 1,015 | 1,070 | 966 |

The principles, preferred embodiments and modes of operation of the present invention have been described in the foregoing specification. The invention which is intended to be protected herein, however, is not to be construed as limited to the particular forms disclosed, since there are to be regarded as illustrating rather than restrictive. Variations and changes may be made by those skilled in the art without departing from the spirit of the invention.

What is claimed is:

1. Organophilic clay composition comprising the reaction product of a smectite type clay having a cation exchange capacity of at least 75 milliequivalents per 100 grams of clay with
   (a) a quaternary ammonium compound having the structure:

$$R_2 - \underset{\underset{R_3}{|}}{\overset{\overset{R_1}{|}+}{N}} - R_4 \quad M^- \qquad (A)$$

wherein $R_1$ is an alkyl group having about 12 to about 22 carbon atoms, wherein $R_2$, $R_3$ and $R_4$ are alkyl groups containing 1 to about 22 carbon atoms, aryl groups and aralkyl groups containing 7 to about 22 carbon atoms and wherein M is chloride, bromide, iodide, nitrite, nitrate, sulfate, hydroxide, or acetate, and
   (b) a betaine type compound having the structure:

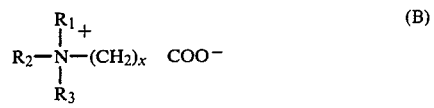

$$R_2 - \underset{\underset{R_3}{|}}{\overset{\overset{R_1}{|}+}{N}} - (CH_2)_x \quad COO^- \qquad (B)$$

wherein $R_1$, $R_2$ and $R_3$ have the same meaning as described above and wherein x has a value of 1 to 4.

2. The composition of claim 1 wherein (A) is present in the amount of about 50 to about 200 meqs and (B) is present in the amount of about 1 to about 100 meqs, said meqs being based on 100 grams of clay. (100 percent active basis).

3. The composition of claim 2 wherein (A) is present in the amount of about 100 to about 140 meqs and (B) is present in the amount of 20 to about 40 meqs.

4. The composition of claim 1 wherein $R_1$ and $R_2$ in (A) are alkyl groups having about 12 to about 22 carbon atoms, $R_3$ and $R_4$ are methyl and M is chloride.

5. The composition of claim 1 wherein $R_1$ and $R_2$ in (B) are alkyl groups having about 12 to about 22 carbon atoms, $R_3$ is methyl and x is 1.

6. The composition of claim 1 wherein (A) is di(hydrogenated tallow) dimethyl ammonium chloride.

7. The composition of claim 1 wherein (B) contains two hydrogenated tallow groups and one methyl group on the nitrogen atom and wherein n is 1.

* * * * *